United States Patent
Williams et al.

(10) Patent No.: US 11,539,773 B2
(45) Date of Patent: *Dec. 27, 2022

(54) SYSTEMS, METHODS, AND DEVICES FOR PROVIDING NETWORKED ACCESS TO MEDIA SIGNALS

(71) Applicant: Audinate Holdings Pty Limited, Ultimo (AU)

(72) Inventors: Aidan Michael Williams, Chifley (AU); James Henry Westendorp, Croydon (AU)

(73) Assignee: AUDINATE HOLDINGS PTY LIMITED, Ultimo (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,069

(22) Filed: Jun. 24, 2021

(65) Prior Publication Data
US 2021/0392178 A1    Dec. 16, 2021

Related U.S. Application Data (63) Continuation of application No. 16/432,407, filed on Jun. 5, 2019, now Pat. No. 11,075,967, which is a
(Continued)

(51) Int. Cl.
*H04L 65/612* (2022.01)
*G06F 3/16* (2006.01)
(Continued)

(52) U.S. Cl.
CPC ............ *H04L 65/612* (2022.05); *G06F 3/165* (2013.01); *H04H 60/04* (2013.01); *H04J 3/0661* (2013.01);
(Continued)

(58) Field of Classification Search
CPC ... H04L 65/4084; H04L 41/12; H04L 65/602; H04L 67/06; H04J 3/0661
See application file for complete search history.

(56) References Cited

U.S. PATENT DOCUMENTS

| 2010/0228881 A1 | 9/2010 | Williams et al. |
| 2013/0283164 A1 | 10/2013 | Mahalingam |

(Continued)

OTHER PUBLICATIONS

"What's new in JACK2?", Nov. 2, 2013, http://web.archive.org/web/20131102175303/http://lac.linuxaudio.org/2009/cdm/Thursday/01_Letz/01 .pdf (Year: 2013).*

(Continued)

*Primary Examiner* — Suraj M Joshi
(74) *Attorney, Agent, or Firm* — Jones Day (57) ABSTRACT

A system for providing networked access to media signals, the system comprising at least one virtual media card configured to interface with at least one application that produces and/or consumes media signals, and/or at least one media interface configured to interface with at least one physical media card that produces and/or consumes media signals. The system may also comprise a network interface configured to enable the system to exchange media signals with other devices on a common network, and a reference clock configured to provide a common clock signal to the at least one virtual media card, the at least one media interface, and the common network. An advertisement and discovery module configured to identify when the at least one application is started and/or stopped and when the at least one media card is attached and/or detached from the system may also be provided. The advertisement and discovery module is configured to: (i) make I/O channels of the at least one media card available to the system and the common network, and (ii) make I/O channels of the at least one
(Continued)

application available to the system and the common network.

18 Claims, 7 Drawing Sheets

Related U.S. Application Data continuation of application No. 15/317,791, filed as application No. PCT/AU2015/000345 on Jun. 10, 2014, now Pat. No. 10,419,506.

(60) Provisional application No. 62/010,195, filed on Jun. 10, 2014.

(51) Int. Cl.
  *H04H 60/04* (2008.01)
  *H04L 65/80* (2022.01)
  *H04L 65/75* (2022.01)
  *H04J 3/06* (2006.01)
  *H04L 41/12* (2022.01)
  *H04L 67/06* (2022.01)

(52) U.S. Cl.
  CPC ............ *H04L 41/12* (2013.01); *H04L 65/762* (2022.05); *H04L 65/764* (2022.05); *H04L 65/80* (2013.01); *H04L 67/06* (2013.01); *H04J 3/0667* (2013.01)

(56) References Cited

U.S. PATENT DOCUMENTS

2014/0148934 A1    5/2014  Manley et al.
2016/0328272 A1*  11/2016  Ahmed ................. G06F 9/4881

OTHER PUBLICATIONS

Depner, J., "Using the JACK Audio Mastering interface (JAMin)", Jun. 9, 2013, http://web.archive.org/web/20130609160028/http://jamin.sourceforge.net/old/Using_connect.html (Year: 2013).*

Badger, J., "Routing and viewing SMPTE timecode internally form an audio file on a Mac (How to Use QjackCtl)", Nov. 23, 2013, http://web.archive.org/web20131123140619/http://jasonbadger.com/wp/tag/qjackct (Year: 2013).*

International Search Report dated Aug. 27, 2015 for PCT/AU2015/000345.

Letz, S., et al., "What's new in JACK2?" [retrieved from the internet on Aug. 20, 2015],URL: http://web.archive.org/web/20131102175303/http://lac.linuxaudio.org/2009/cdm/Thursday/01_pdf> published on Nov. 2, 2013 as per Wayback Machine Title, Abstract; Sections 1, 3, 2.

Depner, J., "using the JACK Audio Mastering interface (JAMin)", [retrieved from internet Aug. 24, 2015] <URL: http://web.archive.org/web/20130609160028/http://jamin.sourceforge.net/old/Using_connect.html> published on Jun. 9, 2013 as per Wayback Machine $2^{nd}$ Figure.

Badger, J., "Routing and viewing SMPTE timecode internally from an audio file on a Mac (How to Use QjackCtl)", [Retrieved from the internet on Aug. 24, 2015] <URL: http://web.archive.org/web/20131123140619/http://jasonbadger.com/wp/lag/qjackctl/> $8^{th}$ Figure.

"WiNRADiO Digital Bridge™ Virtual Sound Card", Feb. 13, 2014, XP055419945, Retrieved from the Internet: URL: https://web.archive.org/web/20140213090325/http://www.winradio.com/home/vsc.htm.

Anonymous, "Dante Q&A" Mar. 21, 2012 (XP0555691443) Internet: URL:https://web.archive.org/web/20120321051455/http://www.audinate.com/index.php?option=com_contents&view=article&id=99&itemid=155 [retrieved Mar. 14, 2019].

* cited by examiner

SYSTEMS, METHODS, AND DEVICES FOR PROVIDING NETWORKED ACCESS TO MEDIA SIGNALS

CROSS-REFERENCE TO RELATED APPLICATIONS

This application is a continuation of U.S. application Ser. No. 16/432,407, filed Jun. 5, 2019, which is a continuation of U.S. application Ser. No. 15/317,791, filed Dec. 9, 2016, now U.S. Pat. No. 10,419,506, which is the National Phase application of International Application No. PCT/AU2015/000345, filed 10 Jun. 2015, which designates the United States and was published in English, and claims the benefit of priority to U.S. Provisional Application No. 62/010,195, filed 10 Jun. 2014. These applications, in their entirety, are incorporated herein by reference.

This application is related to U.S. application Ser. No. 12/662,994, filed on May 14, 2010, now U.S. Pat. No. 8,005,939; U.S. application Ser. No. 12/451,420, filed on Mar. 26, 2010, now U.S. Pat. No. 8,171,152; U.S. application Ser. No. 12/308,168, filed on May 29, 2009, now U.S. Pat. No. 7,978,696; and International Application No. PCT/AU2007/000668, filed on May 17, 2007. Each of these applications are herein incorporated by reference in their entirety.

FIELD OF THE DISCLOSURE

This disclosure is related to systems, methods, and devices for providing networked access to media signals (e.g., audio, video, multimedia signals). More particularly, this disclosure is related to systems, methods, and devices for providing direct networked access to media signals from sound cards, virtual sound cards, and/or applications.

BACKGROUND

Media signals, such as audio and video signals, within a computer or similar equipment (e.g., a PC or MAC) have historically been difficult to share across a network. Conventionally, software applications made specific classes of signals inside the computer available on the network.

For example, a virtual sound card may be capable of transferring audio to/from applications across a network. Such a virtual soundcard presents a sound card interface to software applications and can transfer audio channels to/from the network thereby providing networked channel transmission for audio applications. A virtual sound card is presented to applications in which each audio channel available to the application is associated with a single audio channel in the network. Signals may be routed to and from anywhere in the network to the channels associated with the application audio channels. From the network, the available channels are virtual soundcard channels—applications and sound cards (e.g. USB hardware) are not visible on the network.

In another example, the Skype application transfers audio from sound cards across the network for the Skype application. Skype provides networked channel transmission for sound cards. In this example, the audio is not available outside of the Skype application.

Aggregate drivers are an example of a workaround to the inability for computers to share media content across a network. With an aggregate driver, sound cards may be combined and their audio rate matched into a single, larger audio interface which can be opened by applications that can only open a single sound card. In this fashion, the audio I/O from many sound cards can be used by a multi-channel audio application without needing to open more than one sound card.

These existing techniques and workarounds do not sufficiently address the inability of systems to take media files from a computer and share them across a network.

Accordingly, it is desirable to have systems, methods and devices capable of taking audio signals from sound cards and/or applications and making them available via a networked routing system.

SUMMARY

In exemplary embodiments, it may be desirable to have systems, methods and devices capable of taking audio signals from sound cards and/or applications and making them available via a networked routing system. For example, in exemplary embodiments, computer sound card input and output channels and/or application audio input and output channels may be directly available on a network.

In exemplary embodiments, the sound card may comprise built-in analogue or digital ports, HDMI audio channels, USB, Firewire or Thunderbolt connected audio devices which can be attached and detached, the "default system input," the "default system output" (which may be a mix of audio from multiple applications using the default system output) and/or virtual sound cards (e.g. DVS, SoundFlower, aggregate driver).

In exemplary embodiments, application audio I/O may include audio coming out of iTunes or Windows Media player, audio going into a recording application like Audacity, audio passing in and out of an application like Skype, and/or audio signals going in and out of a virtual sound card which is used for a specific set (e.g., one or more) of applications.

Exemplary embodiments described herein may provide a system (or a corresponding method or device) for providing networked access to media signals, the system comprising: at least one virtual media card configured to interface with at least one application that produces and/or consumes media signals; at least one media interface configured to interface with at least one physical media card that produces and/or consumes media signals; a network interface configured to enable the system to exchange media signals with other devices on a common network; a reference clock configured to provide a common clock signal to the at least one virtual media card, the at least one media interface, and the common network; and an advertisement and discovery module configured to identify when the at least one application is started and/or stopped and when the at least one media card is attached and/or detached from the system; wherein the advertisement and discovery module is configured to: (i) make I/O channels of the at least one media card available to the system and the common network, and (ii) make I/O channels of the at least one application available to the system and the common network.

In exemplary embodiments the media signals may be audio signals.

In exemplary embodiments the virtual media card may be a virtual sound card.

In exemplary embodiments the media interface may be an audio interface.

In exemplary embodiments the at least one physical media card may be a sound card.

In exemplary embodiments the system may further comprise a media router configured to receive routing requirements and route the media signals from the at least one application and the at least one sound card that produces media signals to the at least one application and the at least one sound card that consume media signals.

In exemplary embodiments the system may further comprise a user interface for enabling a user to create the routing configurations for use by the media router.

In exemplary embodiments the user interface can be used to enable the connection of any combination of I/O channels.

In exemplary embodiments the at least one media interface includes a rate/phase matcher configured to match the rate and/or align the phase of the media signals passing between the at least one media card and the system.

In exemplary embodiments the rate/phase matcher may use an asynchronous sample rate converter to align the media signals.

In exemplary embodiments the system may further comprise a media transceiver configured to control the rate at which medial signals are produced and consumed by the at least one application, the at least one media card, and the other devices on the common network.

In exemplary embodiments the system may further comprise media buffers configured to temporarily store media signals to compensate for timing variations within the system and the common network.

In exemplary embodiments each I/O channel has a network name constructed from the combination of a channel name and a device name.

In exemplary embodiments the virtual media card may be configured to be used by one application.

In exemplary embodiments the virtual media card may be configured to be used by multiple applications.

In exemplary embodiments the virtual media card may support a fixed channel mode of operation.

In exemplary embodiments the virtual media card may support an application multiplexing/demultiplexing mode of operation.

In exemplary embodiments the virtual media card may support a fixed channel mode of operation and an application multiplexing/demultiplexing mode of operation.

In exemplary embodiments the media signals provided to a single virtual media card from the multiple applications may be mixed together.

In exemplary embodiments the media signals provided to a single virtual media card from the multiple applications may not be mixed together.

Exemplary embodiments described herein may provide a system (or a corresponding method or device) for providing networked access to media signals, the system comprising: at least one virtual media card configured to interface with at least one application that produces and/or consumes media signals; a network interface configured to enable the system to exchange media signals with other devices on a common network; a reference clock configured to provide a common clock signal to the at least one virtual media card and the common network; and an advertisement and discovery module configured to identify when the at least one application is started and/or stopped; wherein the advertisement and discovery module is configured to make I/O channels of the at least one application available to the system and the common network.

In exemplary embodiments the system may further comprise at least one media interface configured to interface with at least one physical media card that produces and/or consumes media signals; wherein the reference clock may be configured to provide the common clock signal to the at least one media interface; wherein the advertisement and discovery module may be configured to identify when the at least one media card is attached and/or detached from the system; and wherein the advertisement and discovery module may be configured to make I/O channels of the at least one media card available to the system and the common network.

In exemplary embodiments the media signals may be audio signals.

In exemplary embodiments the virtual media card may be a virtual sound card.

In exemplary embodiments the media interface may be an audio interface.

In exemplary embodiments the at least one physical media card may be a sound card.

In exemplary embodiments the system may further comprise a media router configured to receive routing requirements and route the media signals from the at least one application and/or the at least one sound card that produces media signals to the at least one application and/or the at least one sound card that consume media signals.

In exemplary embodiments the system may further comprise a user interface for enabling a user to create the routing configurations for use by the media router.

In exemplary embodiments the user interface can be used to enable the connection of any combination of I/O channels.

In exemplary embodiments the at least one media interface includes a rate/phase matcher configured to match the rate and/or align the phase of the media signals passing between the at least one media card and the system.

In exemplary embodiments the rate/phase matcher may use an asynchronous sample rate converter to align the media signals.

In exemplary embodiments the system may further comprise a media transceiver configured to control the rate at which medial signals are produced and consumed by the at least one application, the at least one media card, and/or the other devices on the common network.

In exemplary embodiments the system may further comprise media buffers configured to temporarily store media signals to compensate for timing variations within the system and the common network.

In exemplary embodiments each I/O channel may have a network name constructed from the combination of a channel name and a device name.

In exemplary embodiments the virtual media card may be configured to be used by one application.

In exemplary embodiments the virtual media card may be configured to be used by multiple applications.

In exemplary embodiments the virtual media card may support a fixed channel mode of operation.

In exemplary embodiments the virtual media card may support an application multiplexing/demultiplexing mode of operation.

In exemplary embodiments the virtual media card may support a fixed channel mode of operation and an application multiplexing/demultiplexing mode of operation.

In exemplary embodiments the media signals provided to a single virtual media card from the multiple applications may be mixed together.

In exemplary embodiments the media signals provided to a single virtual media card from the multiple applications may not be mixed together.

Exemplary embodiments described herein may provide a system (or a corresponding method or device) for providing networked access to media signals, the system comprising: at least one media interface configured to interface with at least one physical media card that produces and/or consumes media signals; a network interface configured to enable the system to exchange media signals with other devices on a common network; a reference clock configured to provide the common clock signal to the at least one media interface and the common network; and an advertisement and discovery module configured to identify when the at least one media card is attached and/or detached from the system; wherein the advertisement and discovery module is configured to make I/O channels of the at least one media card available to the system and the common network.

In exemplary embodiments the system may further comprise at least one virtual media card configured to interface with at least one application that produces and/or consumes media signals; wherein the reference clock may be configured to provide a common clock signal to the at least one virtual media card; wherein the advertisement and discovery module may be configured to identify when the at least one application is started and/or stopped; and wherein the advertisement and discovery module may be configured to make I/O channels of the at least one application available to the system and the common network.

In exemplary embodiments the media signals may be audio signals.

In exemplary embodiments the virtual media card may be a virtual sound card.

In exemplary embodiments the media interface may be an audio interface.

In exemplary embodiments the at least one physical media card may be a sound card.

In exemplary embodiments the system may further comprise a media router configured to receive routing requirements and route the media signals from the at least one application and/or the at least one sound card that produces media signals to the at least one application and/or the at least one sound card that consume media signals.

In exemplary embodiments the system may further comprise a user interface for enabling a user to create the routing configurations for use by the media router.

In exemplary embodiments the user interface can be used to enable the connection of any combination of I/O channels.

In exemplary embodiments the at least one media interface includes a rate/phase matcher configured to match the rate and/or align the phase of the media signals passing between the at least one media card and the system.

In exemplary embodiments the rate/phase matcher may use an asynchronous sample rate converter to align the media signals.

In exemplary embodiments the system may further comprise a media transceiver configured to control the rate at which medial signals are produced and consumed by the at least one application, the at least one media card, and/or the other devices on the common network.

In exemplary embodiments the system may further comprise media buffers configured to temporarily store media signals to compensate for timing variations within the system and the common network.

In exemplary embodiments each I/O channel may have a network name constructed from the combination of a channel name and a device name.

In exemplary embodiments the virtual media card may be configured to be used by one application.

In exemplary embodiments the virtual media card may be configured to be used by multiple applications.

In exemplary embodiments the virtual media card may support a fixed channel mode of operation.

In exemplary embodiments the virtual media card may support an application multiplexing/demultiplexing mode of operation.

In exemplary embodiments the virtual media card may support a fixed channel mode of operation and an application multiplexing/demultiplexing mode of operation.

In exemplary embodiments the media signals provided to a single virtual media card from the multiple applications may be mixed together.

In exemplary embodiments the media signals provided to a single virtual media card from the multiple applications may not be mixed together.

Other aspects, features, and advantages will become apparent from the following description when taken in conjunction with the accompanying drawings, which are a part of the disclosure and which illustrate, by way of example, principles of the embodiments disclosed herein.

DESCRIPTION OF THE DRAWINGS

Notwithstanding any other forms which may fall within the scope of the disclosure as set forth herein, specific embodiments will now be described by way of example and with reference to the accompanying drawings in which.

DESCRIPTION OF EXEMPLARY EMBODIMENTS

In exemplary embodiments, it may be desirable to have systems, methods and devices capable of taking audio signals from sound cards and/or applications and making them available to other components within an electronic device and/or via a networked routing system. For example, in exemplary embodiments, computer sound card input and output channels and/or application audio input and output channels may be directly available to other components within an electronic device and/or on a network.

In exemplary embodiments, the sound card may comprise built-in analogue or digital ports, HDMI audio channels, USB, Firewire or Thunderbolt connected audio devices which can be attached and detached, the "default system input," the "default system output" (which may be a mix of audio from multiple applications using the default system output) and/or virtual sound cards (e.g., DVS, SoundFlower, aggregate driver).

In exemplary embodiments, application audio I/O may include audio coming out of a playback application like iTunes or Windows Media player, audio going into a recording application like Audacity, audio passing in and out of an application like Skype, and/or audio signals going in and out of a virtual sound card which is used for a specific set (e.g., one or more) of applications. In embodiments, grouping a set of applications may be necessary or desirable when it is difficult to e.g., separate per-application audio from a shared sound card.

In exemplary embodiments, the systems, methods and devices described herein may be capable of providing direct networked access to inside-the-computer media (e.g., audio) signals. In particular, audio signals from sound cards and/or applications may be advertised on the network as network sources and sinks and may be discovered and patched in the same way as other networked audio channels.

Applications may be started and stopped and sound card may be attached/detached from a computer or started/ stopped in the case of virtual sound cards. For example, when a sound card is attached or started, the channels associated with it may be advertised on the network. When a sound card is detached, the advertisements associated with the sound card channels may be removed. Similarly, when an application is started, the advertisements associated with the applications' audio inputs and outputs may be created and when the application is stopped, the advertisements associated with the applications' audio inputs and outputs may be removed.

In certain embodiments, it may be undesirable to have audio channels for sound cards and applications automatically appear on the network. Accordingly, in certain embodiments, a variety of policies may be applied to limit what is automatically made available. For example, resources could be advertised unless they are on a "do not advertise" list. Alternatively, only resources on an explicit list of "allowed advertisements" could be advertised. Advertised resources in this case may be sound card channels, application audio inputs and outputs, or a combination of both. Other advertisement policies may also be supported.

As discussed herein, combining signals from several sound cards often requires the use of software applications like aggregate drivers and exchanging audio between applications often requires some kind of virtual sound card interface. Aggregate drivers, inter-application audio sharing and networked virtual sound cards may be combined to exchange audio between applications, sound cards and the network but differences in signal routing has distinguished inside-the-computer routing and via-the-network routing.

When standalone applications are used (e.g., a combination of MacOSX Aggregate Driver, SoundFlower and Dante Virtual Soundcard), signal routing is managed by each separate software component with separate GUI/configuration settings. An application may be used to combine aggregate driver functionality (including routing between sound cards) and inter-application sharing but would still treat the network interface as a networked virtual sound card with a fixed number of channels. In such applications, audio signals may be routed around inside-the-computer including to/from the sound card side of the networked virtual soundcard and then signals may be routed to/from channels on the network side for the networked virtual sound card via the network.

In contrast, the systems, methods and devices described herein integrate the functionality of aggregate drivers, inter-application audio sharing systems and networked audio routing into a single, coherent signal routing system. The inside-the-computer audio signal is available on the network and has a unique network name. In exemplary embodiments, the network name may be constructed from a channel label and a device name (e.g., Builtln-Left@laptop analogue audio input, or iTunes-Right@laptop). In exemplary embodiments, these signal names may be used to express signal routing without distinguishing between inside-the-computer routing and across-the-network routing. Inside-the-computer and across-the-network may be configured in the same way—using channel labels and device names (channel-label@device-name). Exemplary inputs to the routing system may include sound card input (e.g. USB analogue input, Soundflower), any networked channel source (e.g. Dante transmit channels), application audio outputs (e.g. Skype, iTunes audio), and/or a mixed audio output (e.g. the "Default Soundcard Output" for an OS). Exemplary outputs from the routing system may include sound card output (e.g. USB analogue output, Soundflower), networked channel receivers (e.g. Dante receive channels), Application audio inputs (e.g. Skype, Audacity), and/or a default soundcard input for the OS.

In exemplary embodiments, signal names (e.g., channel-label@device-name) may be used in the routing system to express connections/patches for one or more of the following:

Between inside-the-device audio signals and network channels. Inside-the-device resources like hardware audio I/O ports and application audio channels are now directly routable across the network.

Between applications inside a single device

Between sound card I/O ports inside a single device

In exemplary embodiments, any combination of the types of connections described may be allowed. In exemplary embodiments, multiple output patches for any given signal may be supported, implying that any signal can be replicated to more than one output via the routing system. For example, a patch may be to route USB-analogue-in@deviceA to Skype-Input@deviceB via the network, since deviceA and deviceB are different devices. Or the patch may be to route DAW-application-stereo-mix@laptop to builtin-output@laptop, and DAW-application-stereo-mix@laptop to stereo-input@mixing-console (i.e., the DAW-application-stereo-mix signal may be replicated and passed to a local sound card and across the network). Other exemplary patches may include routing DefaultSystemOutput@laptop to speaker@conference-room or routing microphone@conference-room—>SkypeInput@laptop.

In exemplary embodiments, the systems, methods, and devices described herein may also utilize a reference clock to time align and rate match the media signals from the sound cards and applications. Typically, transmitters of signals over a network emit packets at a rate governed by an underlying hardware media clock (e.g., a sound card crystal). With typical computer equipment, audio sourced from each sound card attached to the computer may be be transmitted at a slightly different rate due to manufacturing variation in the media clock hardware (e.g., frequency variation of quartz crystals). Accordingly, a device receiving streams from one or more sound cards must typically rate match and time align the incoming audio to the receiving sound card(s), which in turn may be running at slightly different rates due to manufacturing variation. Specialized devices may support locking of the hardware media clock to a reference clock (e.g., the Dante-MY16-AUD card and similar devices, or professional sound cards with word clock inputs), however typical sound card hardware rarely supports an adjustable media clock. Typical computer equipment receiving audio from two or more sound cards, either locally attached or via a network stream, must rate match (and optionally time align) incoming audio to the media clocks of the receiving sound card(s) in order to ensure glitch free playout.

In exemplary embodiments, the systems, methods and devices described herein may rate match and time align incoming audio to a shared reference clock. For example, if the computer performing the method is attached to a network, the reference clock may be distributed via the network and may be available to some or all media transmitters and receivers. If the computer is not attached to a network, the reference clock may be locally generated (conceptually the computer provides a reference clock to a network of one device (itself)). In exemplary embodiments, when the systems, methods and devices described herein are transmitting and receiving streams of packets (e.g., using Dante, AES67, the AVB protocol suite, RTP, or some other networked media transport system) the shared reference clock used may be that which is provided by the networked transport system. For example some standardized protocols provide a shared reference clock. The IEEE 1588 Precision Time Protocol versions 1 and 2 are commonly used with Dante, AES67 and RTP. The 802.1AS Standard for Local and Metropolitan Area Networks—Timing and Synchronization for Time-Sensitive Applications in Bridged Local Area Networks may be used with the Audio Video Bridging (AVB) protocol suite. A stream of media packets (e.g. RTP or IEEE 1722) and the Network Time Protocol (NTP) are also examples of shared reference clocks.

Although time alignment of signal capture and playout to a shared reference clock is desirable for many applications, it is not required for glitch-free capture and playout of audio in exemplary embodiments. For example, a system may use a reference clock that supports time alignment (e.g., IEEE 1588) merely to rate match outgoing audio, without ensuring that the captured audio signals are time aligned to the reference clock. Likewise, playout of incoming audio may be rate matched but not time aligned.

In exemplary embodiments, a single device may be conceptualized as a network of one device. Audio signals within a single device may be rate matched and time aligned to a reference signal generated internally to the device.

In exemplary embodiments, a shared reference clock used for rate matching may have one or more benefits. First, audio exchange between sound cards, between network channels, and between sound cards and network channels may be simplified since the rate difference between the sound card and the shared reference clock may be the only parameter which must be obtained. In other systems, a rate difference between every received stream and each corresponding sound card was required, since each stream could be transmitted at the rate of source sound card producing the samples.

Second, the rate difference between each sound card and the shared reference clock may be calculated without transmitting or receiving any media packets. In other devices, a rate difference between the incoming packet stream and a local sound card was measured but since this rate difference cannot be known accurately until several packets have been received, additional buffering was required to ensure glitch free playout while an accurate rate difference estimate was acquired. The additional buffering may introduce extra latency. Additionally, since packet arrival jitter negatively affects rate estimation, many packets may be required to obtain a reasonably accurate estimate of the rate difference between the incoming packet stream and the local sound cards. In contrast, the rate difference between a shared reference clock and the local sound cards calculated by exemplary systems described herein may be continuously and frequently updated without requiring media packets, thereby enabling lower latency by eliminating unnecessary buffering and reducing startup time.

Third, audio processing (e.g., mixing of signals) may be simplified since the signals inside a device and on the network are rate matched to a common reference clock.

In exemplary embodiments, a shared reference clock supporting time alignment may have one or more of the following benefits (in addition to those provided by rate matching alone).

First, the phase alignment of signals captured by different sound cards can be preserved, even though each sound card may have a different media clock rate due to manufacturing variation. In exemplary embodiments, the phase alignment of captured signals may be preserved even between sound cards connected to different computers.

Second, the phase alignment of signals played out from different sound cards can be preserved, even though each sound card may have a different media clock rate due to manufacturing variation. In exemplary embodiments, signal playout phase alignment may be preserved even between sound cards connected to different computers.

Third, compensation for fixed input and output delays in sound cards may be applied, ensuring that signals passed through sound cards with different delays remain time aligned.

Forth, time alignment information (i.e., rate difference and phase offset between the sound card and the shared reference clock) can be calculated without transmitting or receiving any media packets. Generally, time alignment between media streams has been achieved by including timestamps in media packets, for example RTP uses wall clock timestamps to provide lip sync between a video stream and any associated audio streams. If the streams to be time aligned are sourced from the same device, good alignment can be achieved since both streams contain timestamps obtained by a reference clock shared by both streams—typically the system time of day in the sending device. However, streams from different devices are typically not time aligned since many systems do not have a shared reference clock and if they did, time alignment information may need to be computed for each incoming stream, which is complicated. In exemplary embodiments described herein, the time alignment information (rate difference and phase offset between the each sound card and the shared reference clock) can be continuously and frequently updated without requiring media packets, supporting time alignment between the media streams regardless of source.

Fifth, virtual sound cards attached to exemplary systems, methods and devices described herein (e.g., SoundFlower) and applications connected to the exemplary systems, methods, and devices via a virtual sound card interface may be capable of sending and receiving time aligned audio. Accordingly, phase alignment of incoming signals and playback of output signals can be assured whether the signals are coming from one or more local sound cards or from other sources in the network. As a result, software applications can perform sophisticated signal processing operations like beam steering or spatial location of audio sources since phase alignment is preserved.

Figure 1:
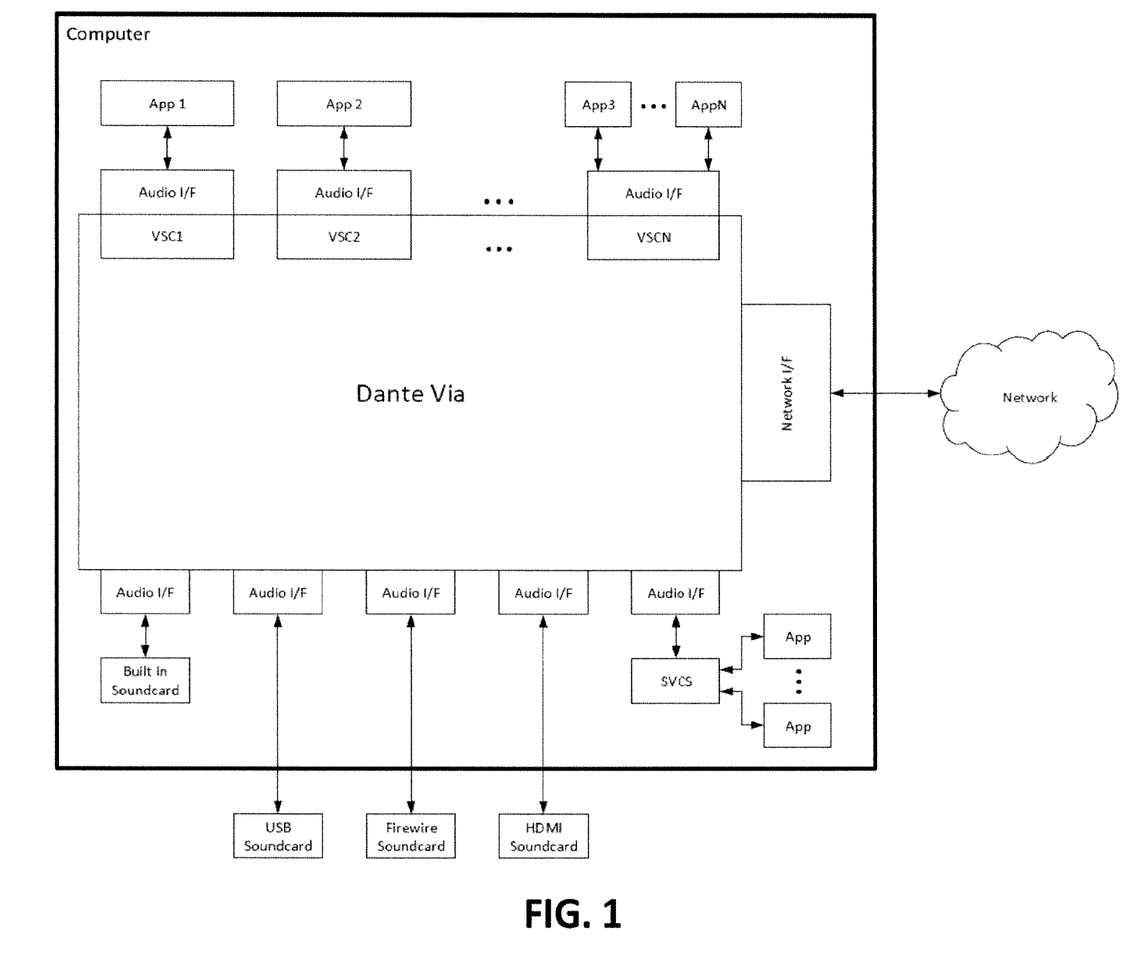
FIG. 1 is a network diagram of an exemplary embodiment of the systems and methods described herein in the context of a networked environment.

In exemplary embodiments, the systems and/or methods described herein may be implemented in software which may be executed in a computer. In exemplary embodiments, the software may be responsible for transferring audio signals between sound cards, applications and streams of network packets. FIG. 1 is a network diagram of an exemplary embodiment of the systems and methods described herein in the context of a networked environment. In particular, FIG. 1 shows the relationships between an exemplary embodiment of the software and its environment.

As shown in FIG. 1, the system may comprise one or more audio interfaces (Audio I/F). The Audio I/F may be the software layer used between audio applications and sound cards. The Audio I/F may be provided by an operating system (e.g., CoreAudio provided by Mac OS X).

FIG. 1 also comprises Virtual sound cards (VSC1-VSCN). In exemplary embodiments, the software may define one or more such virtual sound cards. A virtual sound card is a sound card implemented in software. In exemplary embodiments, to applications, virtual and hardware sound cards may be indistinguishable. In exemplary embodiments, the system may provide multiple virtual sound cards. For example, VSCN shown in the diagram is being used by several applications while VSC1 and VSC2 shown in the diagram each used by a single application only.

During normal operation, an audio channel provided by an application attached to a sound card is mixed together with the corresponding audio channel from every other application and delivered to the Audio I/F software; and each audio channel provided by the Audio I/F to applications is replicated to every corresponding application input channel. Exemplary systems and methods described herein, however, may implement audio interfacing components to enable audio passing to and from each application to be kept separate even though many applications are using the same virtual sound card interface (e.g., VSCN). In exemplary embodiments, this may enable audio routing to specific applications even when they share a virtual sound card interface, which may be important since sound card input and/or output cannot be configured in many applications (e.g., Microsoft PowerPoint) and many such applications will use the "system default" audio sound card input and output settings.

The system may also include a network interface. The network interface may be used to advertise and discover available networked audio channels, to exchange media packet streams with other devices on the network and/or to configure signal routing in the system. Signal routing may also be configured locally via e.g., a graphical user interface (GUI) application, configuration file, internal configuration messages or similar mechanisms. Other devices attached to the network may comprise the software as well, but they may also be using a general media transport system like Dante, AES67, the AVB protocol suite or RTP. The network interface may also used be to distribute a reference clock through the network or receive a reference clock from the network.

In exemplary embodiments, the computer executing the software may include one or more sound cards. The sound cards may be built-in to the computer or they may be external to the computer. Many types of external sound cards (e.g., USB, Firewire and Thunderbolt) may be attached and detached from the computer with or without warning. Accordingly, in exemplary embodiments, the resources provided by detachable sound cards (e.g., audio channels and their associated labels) may dynamically appear and disappear depending on device attachment.

In exemplary embodiments, the system may also support a Standalone Virtual Sound Card (SVSC). There are several types of virtual soundcards, notably aggregate drivers (which combine channels from two or more sound cards into a single sound card) and inter-application sharing drivers (which typically copy audio from input channels to output channels in a loopback fashion). In exemplary embodiments, the systems and methods described herein can be attached to standalone virtual sound cards like the Mac OS X Aggregate Driver and SoundFlower via standard audio interface APIs.

Figure 2:
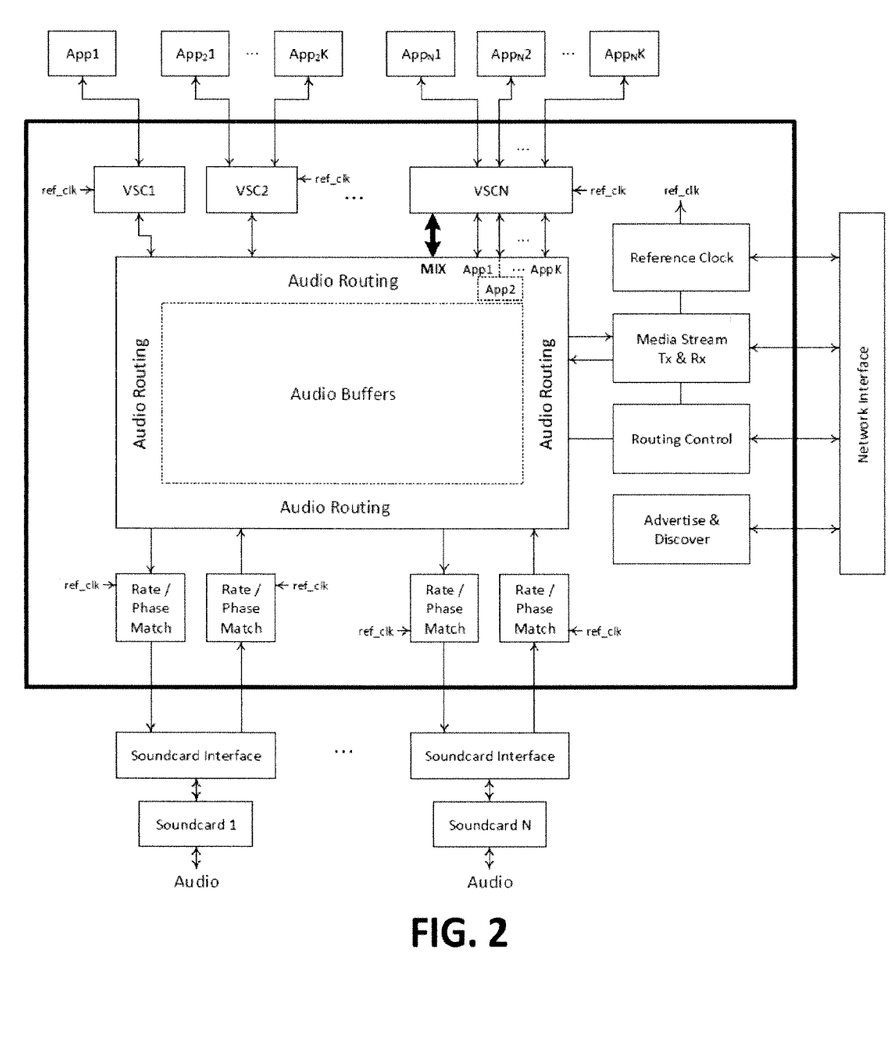
FIG. 2 is a functional block diagram of an exemplary embodiment of the systems and methods described herein.

FIG. 2 is a functional block diagram of an exemplary embodiment of the systems and methods described herein. In particular, FIG. 2 illustrates the functional elements of an exemplary software implementation of the systems and methods described herein. The elements inside the outermost box are part of the exemplary system. Applications, sound cards, sound card interfaces and the network interface that are outside the outermost box and external to the system described herein but provided for context. In practice, an actual implementation of the systems and methods described herein may combine the functional blocks or refactor the blocks differently for reasons of efficiency, source code management, performance, latency, etc.

As illustrated the system comprises a reference clock which provides a clock signal labelled as ref_clk in the diagram to many of the system components. In exemplary embodiments, the ref_clk signal may provide one or both rate and phase/time alignment of information. The blocks labeled "VSC1"-"VSCN" (virtual sound card) in FIG. 2 show a ref_clk input since the reference clock may govern the rate at which audio samples are transferred between the application and the virtual soundcard. The blocks labeled "rate/phase match" in the diagram show a ref_clk input since an asynchronous sample rate converter can rate match and optionally phase align audio passing between the audio buffers and the Sound Cards 1-N. Appropriate control of the asynchronous sample rate converter may require an estimate of the rate difference between each sound card media clock rate and the reference clock and an estimate of the phase difference between each sound card media clock and the reference clock. The block labelled "media stream TX & RX" shows a ref_clk input since the rate at which media packets are produced and consumed may be directly governed by the ref_clk signal.

Additionally, media packets may be timestamped using the ref_clk signal, allowing the media contained in them to be time aligned at receivers. Typically, the system may be used in a network and may exchange audio with other networked devices. In this case, the ref_clk signal may be locked to a shared network reference clock (e.g., provided by a network time protocol like IEEE1588, 802.1AS or NTP, or provided by some other stream of packets containing timing information). Alternatively, the system may provide a shared network reference clock by using a network time protocol (e.g., IEEE1588, 802.1AS or NTP) to distribute the ref_clk signal throughout the network. Additionally, media packets transmitted by the system may contain timestamps derived from ref_clk and may therefore be used by a device receiving a media stream from the system to derive a clock which is slaved to the system ref_clk signal. In exemplary embodiments, media packet stream transmitted by the system will at minimum provide information about the rate of the ref_clk signal, since the ref_clk signal directly governs that rate at which media packets are transmitted.

In exemplary embodiments, the media interfaces to the system aim to transfer audio at regular and predictable intervals, however interfaces may be subject to timing variation to some extent. Depending on the interface, timing variation magnitude can range from microseconds to milliseconds to several seconds. For example, media packets may experience jitter in delay as they pass through a network containing other traffic; applications experience scheduling jitter as operating systems multi-task; and the timing of audio transfers to/from sound cards beats with respect to ref_clk according to the rate difference between the sound card media clock and wanders as the sound card hardware clock varies with temperature. Accordingly, in exemplary embodiments, the system may comprise audio buffers. The audio buffers in the system may be configured to compensate for timing variation in the transfer of media signals through the system interfaces to sound cards, applications and the network. The audio buffers in the system may also be used to delay signals so that they can be time aligned. For example, two hardware sound cards may have differing input and/or output delays. Delays may be introduced to compensate for fixed phase offsets between signals by storing audio samples in the audio buffers.

In exemplary embodiments, the system may also comprise an audio routing/signal routing block. The audio routing block may be configured to transfer input audio data from channels provided by applications, sound cards and media streams to the audio buffers and transfer output audio data from the audio buffers to channels accepted by applications, sound cards and media streams. In exemplary embodiments, the audio routing system may transfer audio data between input and output channels via the audio buffers in accordance with the signal routing required by a given application.

From a user point of view, audio signal routing may be configured using channel labels and device names. The routing control block may convert the label based signal routing specified by the user into simpler audio channel routing configurations which in turn may control how the audio routing block transfers audio data between the audio buffers and applications, sound cards and media streams.

To allow several input signals to be simultaneously routed to a single output port, the audio routing block may provide matrix mixing functionality. In exemplary embodiments, matrix mixing may comprise the ability to construct output signals that are weighted sums of the set of input signals routed to that output port. Additionally, in exemplary embodiments, an input signal may be routed to many output ports simultaneously.

Figure 3:
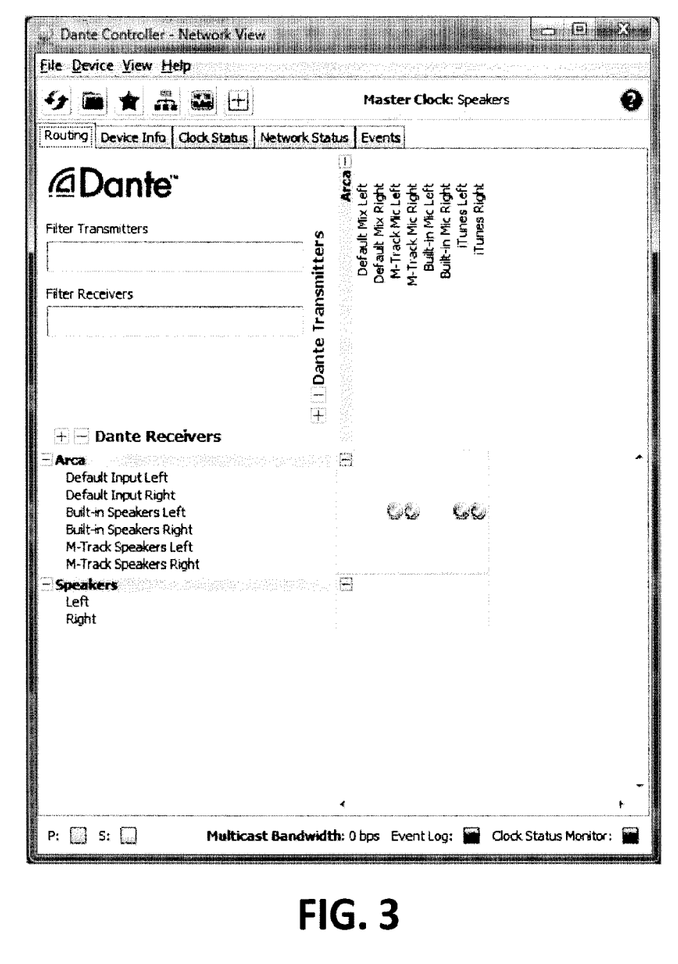
FIG. 3 is an exemplary embodiment of a user interface for signal routing using matrix mixing.

FIG. 3 is an exemplary embodiment of a user interface for signal routing using matrix mixing. In FIG. 3, four input channels (iTunes Left, iTunes Right, M-Track Mic Left and M-Trace Mic Right) are all routed to a single mono output channel labeled "Built-in Speakers Left". In this routing configuration, the output channel is the mix (i.e., weighted sum) of the four input channels. In the simplest mixing case, the weights are all 1.0, but in general each channel may have a different weight (gain/attenuation) in the mix.

Accordingly, in exemplary embodiments, the audio routing block may perform any or all of the four different tasks. The audio routing block may transfer audio samples between sound cards & audio buffers, transfer audio samples between virtual sound card interfaces & audio buffers, transfer audio samples between network audio streams & audio buffers, and/or combine two or more signals destined for the same output port using a weighted sum.

As discussed previously and shown in FIG. 2, the system may comprise one or more rate/phase match blocks which may use an asynchronous sample rate converter (ASRC) to adapt audio transferred between a sound card and the audio buffers, ensuring glitch free, time aligned audio capture and playback. In operation, a block of B samples passed through an Asynchronous Sample Rate Converter results in R*B samples at the output where 1/R is the ratio between the input and output sampling rates. In exemplary embodiments, the ASRC may change the sampling interval while preserving the audio signal represented by the sample values.

In exemplary embodiments, the rate difference can be estimated because periodic events are triggered in the sound card interface layer at a rate which is directly related to the sound card media clock. These events are typically related to audio sample buffer transfers from the sound card to system memory and can be timestamped with ref_clk. The resulting sequence of timestamps can be used to estimate the rate difference between the sound card media clock and the ref_clk, and to estimate the phase difference between the sound card media clock and the ref_clk. In exemplary embodiments, the rate/phase match block may use rate and phase difference estimates in a Phase Locked Loop (PLL) to control the ASRC ratio parameter such that the rate of samples provided to and consumed by the sound card interface is matched (or at least substantially matched) to the rate of samples consumed by and provided to the system audio buffers over the long term. In exemplary embodiments, this may be desirable for glitch free audio. Additionally, the phase difference between the sound card media clock (represented by the phase of first sample in the audio buffer transfer after it has been passed through the ASRC) and the ref_clk is reduced over the short term and minimized (or at least substantially minimized) over the long term.

Phase Locked Loop (PLL) techniques for causing one clock to track another are well understood in the art and should be well understood by a person of ordinary skill in the art. In exemplary embodiments, the sound card media clock, adapted by the ASRC, may be caused to track the ref_clk by adjusting the ASRC ratio parameter.

The system in FIG. 2 also comprises a plurality of virtual sound card interfaces (VSC1-VSCN). The virtual sound cards are interfaces between the system and the audio applications. The interfaces appear as sound cards to the applications, however they may be implemented in software. Applications transfer audio through the virtual sound cards, to and from the system using standard sound card APIs such as CoreAudio. The rate at which audio samples and/or buffers are transferred between the application and the virtual sound cards is determined by the ref_clk input to the VSC blocks.

In exemplary embodiments, the virtual sound cards may support two modes of operation (1) fixed channel (shown in FIG. 2 as blocks labeled VSC1 and VSC2) and/or (2) application Mux/DeMux (shown in FIG. 2 as the block labeled VSCN).

In fixed channel mode of operation, the virtual sound card has a fixed number of input and output channels. The virtual sound card provides input and output channels to audio applications using a standard sound card API (e.g. CoreAudio) and there is a one to one correspondence between audio channel buffers and virtual sound card inputs and outputs. Applications use a standard sound card API to transfer audio data to/from the virtual sound card, which in turn transfers audio data to/from the system audio buffers. In exemplary embodiments, typical sound card behavior may apply in fixed channel mode. For example, audio output from applications sharing the same virtual sound card (e.g. $App_2 1$-$App_2 K$ in FIG. 2) may be mixed together by the sound card API. Additionally, audio input provided to applications sharing the same virtual sound card (e.g. $App_2 1$-$App_2 K$ in FIG. 2) may be replicated for each application connected to the virtual sound card by the sound card API.

In the application Mux/Demux mode of operation, the virtual sound card has a fixed number of input and output channels, however additional channels are available between the audio routing block and the virtual sound card. The fixed input and output channels are labeled "Mix" in FIG. 2. The additional channels have a one-to-one association with audio applications connected to the virtual sound card interface and are labeled as App1, App2, . . . AppN in FIG. 2. Audio passing through the App1 channel is exclusively sourced by $App_N1$, or is exclusively destined for $App_N1$. The audio passing through the App1 channel is not mixed with audio from the other applications connected to VSCN ($App_N2$-$App_NK$). Likewise, the audio passing through each set of the AppK channels is exclusively associated with application $App_NK$. Using such a system, audio may be routed to and from specific applications even when they are attached to the same sound card.

Figure 4:
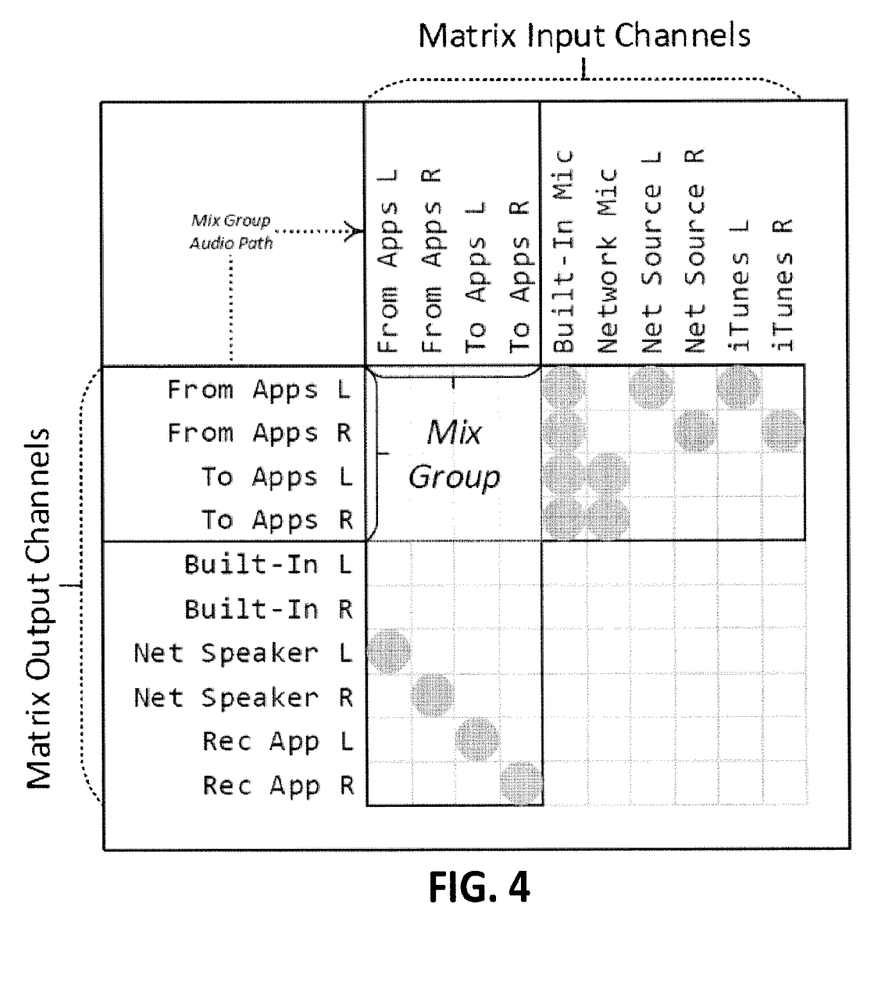
FIG. 4 is an exemplary embodiment of a user interface for signal routing with mix groups.

In exemplary embodiments, the systems, methods and devices described herein may also be capable of creating Mix groups. FIG. 4 is an exemplary embodiment of a user interface for signal routing using mix groups. In exemplary embodiments, input channels may be mixed together by the audio routing block to form another set of channels called "Mix Groups." The new input and output channels created by a mix group may be given labels and appear in the routing matrix in the same fashion as any other channel in the system. This functionality may be desirable to create default input and default output mixes for applications connected to virtual sound card interfaces as well as in many typical applications where signals need be combined in flexible ways. In exemplary embodiments, input and output channel labels associated with the mix group may appear in the routing matrix so that the input channels to be mixed together for each channel in the mix group may be selected; and/or channels created by the mix group may be routed to soundcards, applications and across the network and even into additional mix group inputs.

In exemplary embodiments, audio entering the system from an application, sound card or network stream may pass through one or more mix groups before exiting the system as an audio channel to an application, sound card or network stream.

As shown in FIG. 4, the matrix routing view includes two mix groups labeled "From Apps" and "To Apps" respectively. In the embodiment shown in FIG. 4, the audio from the local microphone input labeled ("Built-In Mic") and a network microphone labeled ("Network Mic") are mixed to provide input channels for the recording application ("Rec App"). The audio from the "iTunes" application, a network source ("Net Source") and the microphone ("Built-In Mic") are mixed together before being transmitted to a network connected loudspeaker ("Net Speaker").

As described above, the fixed channels may behave like a typical sound card—the audio output from applications sharing the same virtual sound card is mixed together and audio input provided to applications sharing the same virtual sound card may be replicated for each application connected via the sound card API. This behavior may be implemented by creating a mix group for the fixed input channels and a mix group for the fixed output channels when the virtual sound card is created. The mix group for the fixed input channels combines audio channels from applications according to user configuration. The mix group for the fixed output channels combines matrix input channels into audio channels sent to applications according to user configuration.

If an application has no specific route for its input channels, it may receive audio from the fixed channels labeled "Mix" in FIG. 2. If an application has no specific route for its output channels, audio it provides may be mixed into the fixed channels labeled "Mix" in FIG. 2.

Alternatively, if an application has a specific route for its input channels, it may receive audio exclusively from the associated App channels (labeled $App_1$ . . . $App_N$ in FIG. 2). Note that the matrix mixer provided by the audio routing block allows several input channels to be mixed together into an output channel exclusively associated with an application. Conversely, if an application has a specific route for its output channels, it may transfer audio exclusively to the associated App channels (labeled $App_1$ . . . $App_N$ in FIG. 2). Audio from this application may not be mixed into the audio channels labeled "Mix".

The audio resources (input and output channels) available to the system for routing may vary with time. In embodiments, every audio resource may have an associated label and device name (e.g., channel-label@device-name). Signal routing between inputs and outputs may be expressed in terms of channel labels and device names, regardless of whether the signal is located inside the computer (e.g., sound cards and applications) or somewhere on the network.

Audio resources may appear and disappear for a variety of reasons. For example, sound cards may be attached and/or detached to the system, applications may be started and/or stopped, network channels may appear and/or disappear as devices are added or remove from the network or as network faults occur and are rectified, and mix groups are created or deleted.

When audio resources appear, the system may associate each audio channel with a channel label and device name (typically the name of the computer running the software) and advertises the availability of those channels on the network. The system may advertise audio channels as Dante network channels or any other advertisement systems may be used. The advertised information may allow other devices connected to the network to discover the available channels and configure media packet streams to transfer audio to and from the audio resources inside the system.

When audio resources disappear, the system may remove the advertisements associated with the audio resources that are no longer available. Other Dante devices may be unable to discover the audio resources that are no longer available and will therefore be unable to set up media streams to/from the channels that are no longer available.

Dante Controller is an example of a standalone application that can perform signal routing through a network using the advertisements provided by the system described herein. In exemplary embodiments, signal routing may be a separate function from media signal transport. For example, Dante Controller may configure signal routing but doesn't produce nor consume media packet streams.

In exemplary embodiments, the advertise and discover block may sense the arrival and departure of available audio resources in a variety of ways, including, but not limited to: USB hot plug events as devices are attached and detached (Firewire and Thunderbolt have similar events); impedance sensing events detecting the presence or absence of connections to input or output ports; network interface events such as link up and link down; appearance and disappearance of Dante channel advertisements on the network; and/or information provided by the system Virtual Sound Card (VSC)

interfaces as applications start and stop, attaching to and detaching from the VSC interface; and notifications from other functional blocks such as routing control and/or audio routing that mix groups have been created or deleted, channel labels have been changed, parameters have changed (e.g. sample rate or number of channels), etc.

In exemplary embodiments, information about the arrival and departure of audio resources may be provided to other functional blocks inside the system to facilitate instantiation and reclamation of functional blocks as needed (e.g., rate/phase match blocks associated with removable sound cards); to support timely creation and removal of network channel resources and media packet streams; and to trigger the configuration of signal routing via the "Audio Routing" block.

The input and output channels of USB sound cards may be formed by concatenating the device name provided by the USB sound card driver and a short identifier. If the device is a single channel, no short identifier need be appended. If the device has two channels, the identifiers "Left" and "Right" may be appended (e.g., "M-Track Mic Left" and "M-Track Mic Right"). If the device has more than two channels, a number 1 . . . N may be appended. If the USB sound card driver can supply non-numeric channel labels, these may be appended instead of digits or the left/right labels. If several USB devices with the same USB device name are attached, a digit may be inserted into the channel label after the device name to disambiguate the channel labels for each device.

The input and output channels of Virtual Sound Cards running in fixed channel mode may be advertised with names derived from the name provided to the virtual sound card interface. For example, if the virtual sound card interface was called "DAW", the advertised channels may be labeled "DAW In 1", "DAW In 2", . . . "DAW In 16", "DAW Out 1", . . . "DAW Out 16").

The "Mix" channels of a virtual sound card interface running in application Mux/DeMux mode may be advertised with names derived from the name provided to the virtual sound card interface. For example, the "Mix" channel labels for a two input, two output virtual sound card interface with name "Default" may be "Default In Left", "Default In Right", "Default Out Left", "Default Out Right".

The "App" channels of a virtual sound card interface may be advertised with names derived from the application attached to the interface. For example, assuming the application is called Skype the channels may be labeled "Skype In" and "Skype Out". Presets describing default channel labels for specific applications allow sensible labels to be applied to applications.

It may be desirable that audio resources be assigned consistent labels even when they are attached and detached from the system. It may be desirable that the inputs and outputs of a USB sound card remain the same as it is attached and detached. This may allow audio signals to be routed and configured with stable names. Additionally, it may be desirable that two identical sound cards retain the labels associated with each of their inputs and outputs regardless of which order they are attached and detached. In exemplary embodiments, USB and Firewire devices may have unique identifiers which may be used to restore the correct labels when a device is reattached to a system. The situation may be more difficult with applications, since several copies of a given application can be attached to a virtual sound card at the same time. To the extent that it is possible, in exemplary embodiments, a stable channel label may be derived from a combination of the application name and associated user name associated with each instance.

In general, the user may override channel labels for a given audio resource and those changes may or may not be persistent. In exemplary embodiments, the system may be capable of storing the channel labels configured by the user and (assuming the audio resources the label refers to can be unambiguously identified) the system may use the same labels for the channels the next time the device is plugged in, or the next time the application is started.

Channel labels within a Rialto device must be unique. Across the network, channel labels are scoped by a device name and the device name must in turn be unique throughout the network in order for a channel-label@device-name to uniquely identify an audio resource in the network.

As illustrated, the system shown in FIG. 2 also comprises a media stream TX and RX block which may be responsible for sending and receiving audio signals across the network. The system may use Dante network channels, however other signal transports could be used including, but not limited to, AES67, the AVB protocol suite and/or RTP.

In response to configuration by the user, the routing control block may instruct the media stream TX & RX block to transmit or receive a media packet stream and/or transfer audio samples between the media packet stream and the system audio buffers. The rate at which media packets are produced and consumed is directly governed by the ref_clk. The precise mapping of audio channels to media packet streams is a matter of policy and is decided by the routing control block.

The system in FIG. 2 also comprises a routing control block which configures the various functional blocks inside the system to achieve the routing configuration expressed by the user in signal labels. When a label based routing change is made, the Routing Control block may need to:

Discover network channels and their parameters.
Configure the media stream TX & RX block to send audio channels to another networked device or receive channels from another networked device in media packet streams.
Reconfigure audio channel transfer mapping to/from an existing media packet stream to/from the system audio buffers.
Reconfigure audio routing block channel routing to match the desired signal routing specified by the labels.
Alter the audio channel transfer mappings for the VSC interfaces operating in Mux/DeMux mode, for example when a specific route to an application is added or removed.
Reconfigure audio channel transfer mappings to/from audio buffers associated with mix groups.

In exemplary embodiments, the routing control block listens to events generated by the advertise & discover block as audio resources appear and disappear, and carries out the actions required to restore audio routes configured previously or removes routes that are no longer required. Example of events that may need such action include, without limitation, a removable sound card is attached, a removable sound card detached, an application connected to a VSC interface is started, an application connected to a VSC interface is stopped, a network channel becomes available, a network channel disappears and/or a custom mix group is created or deleted.

In exemplary embodiments, in order to transmit and receive signals across the network, the routing control block may need to use the advertise & discover block to acquire the information needed to create media packet streams, for example: IP addresses, port numbers, channel mappings, audio formats, sample rates, etc.

FIGS. 5A-5D are exemplary embodiments of a user interface for discovery and routing of media signal. As illustrated, these figures illustrate a controller matrix routing view as audio resources appear and disappear in a computer running the system described herein. The controller matrix view shows network channel inputs and outputs. In exemplary embodiments, signals may be routed between inputs and outputs by clicking on a cross point.

Figure 5A:
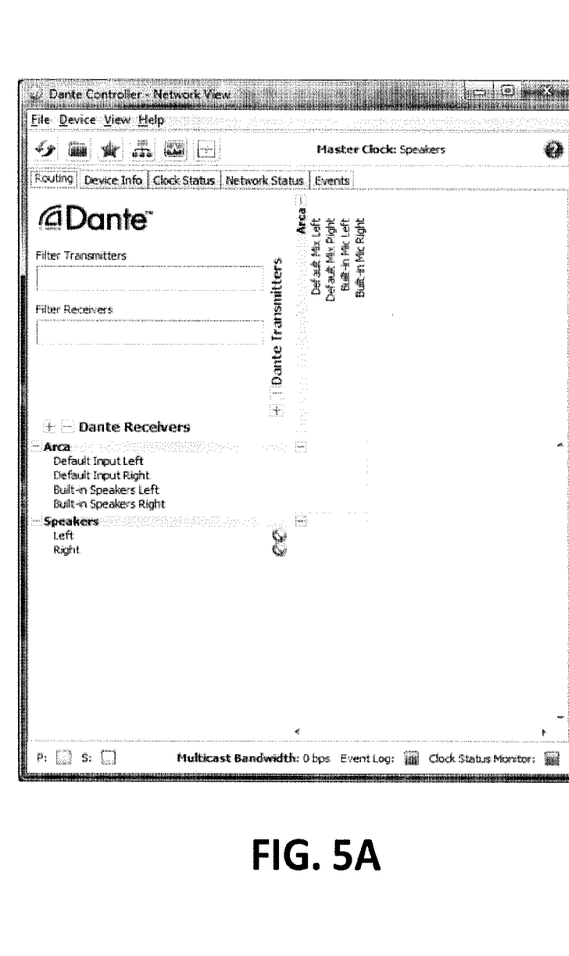
FIG. 5A is an exemplary embodiment of a user interface for discovery and routing of media signal in which a USB device is disconnected.

FIG. 5A is an exemplary embodiment of a user interface for discovery and routing of media signal in which a USB device is disconnected. When the USB device is disconnected, the labels for its channels cannot be resolved. This is why there are two circular symbols shown next to the Speakers input channels in the Dante Controller view.

Figure 5B:
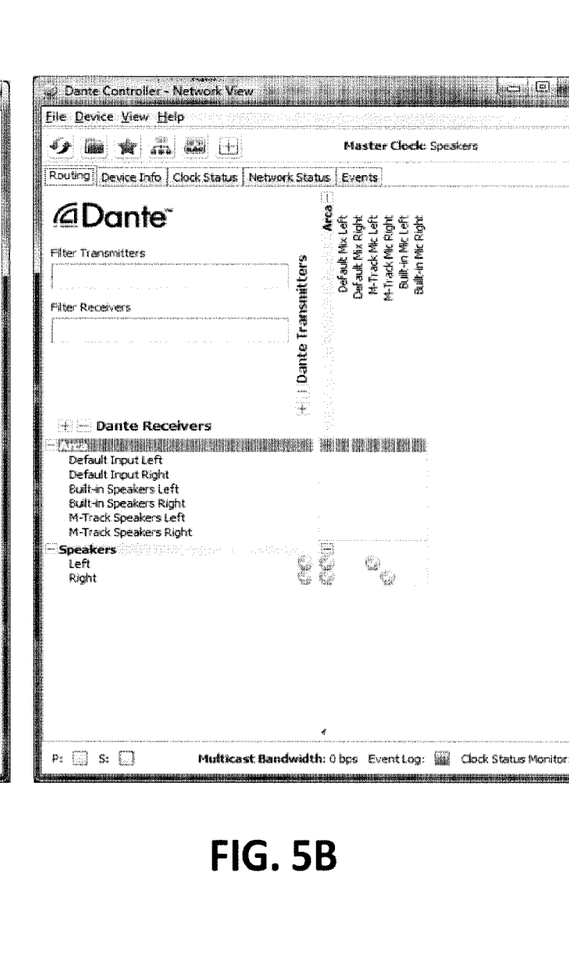
FIG. 5B is an exemplary embodiment of a user interface for discovery and routing of media signal in which a USB device is connected.

FIG. 5B is an exemplary embodiment of a user interface for discovery and routing of media signal in which a USB device is connected. When the USB device (M-Track Mic) is connected, new Dante transmit channels are created for each USB microphone channel. The channel labels may be constructed by concatenating the USB device name "M-Track Mic" and the USB sound card driver labels for the channels (i.e. the words "Left" and "Right").

Figure 5C:
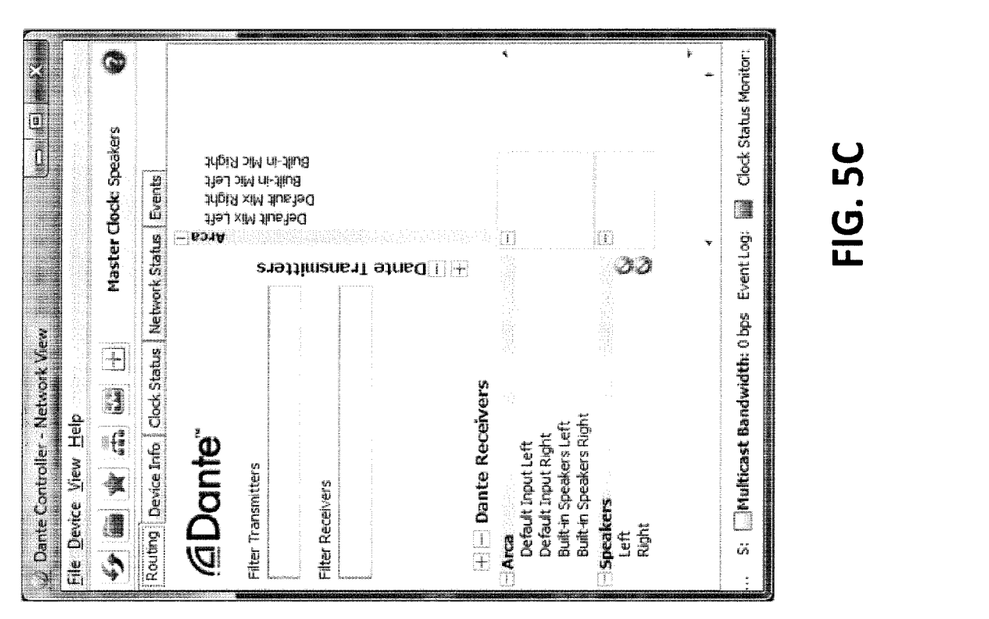
FIG. 5C is an exemplary embodiment of a user interface for discovery and routing of media signal in which an application (e.g., iTunes) is disconnected.

FIG. 5C is an exemplary embodiment of a user interface for discovery and routing of media signal in which an application (e.g., iTunes) is disconnected. When the iTunes application is not running, the labels for its channels cannot be resolved. This is why there are two circular symbols shown next to the Speakers input channels in the Dante Controller view.

Figure 5D:
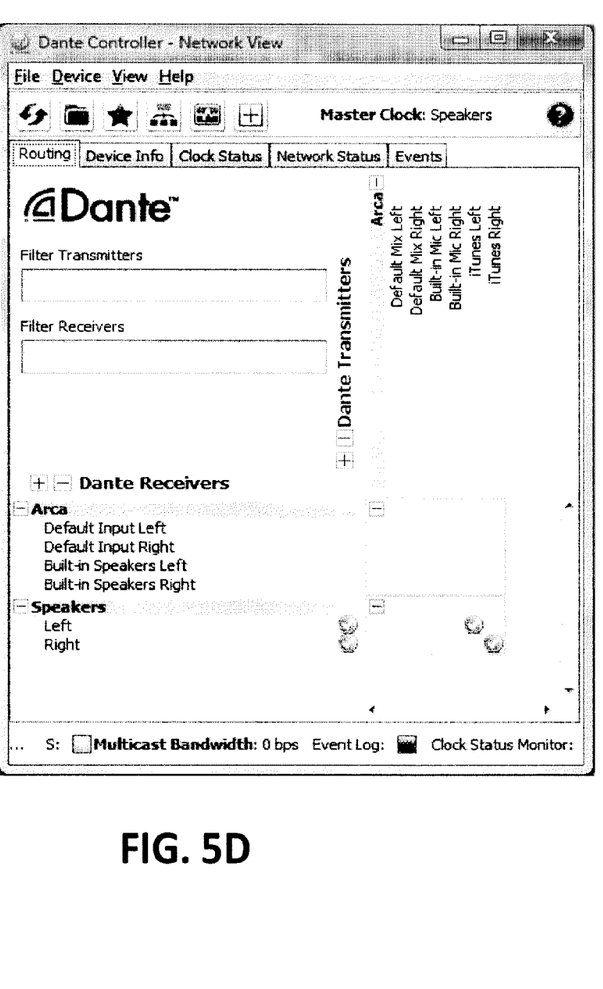
FIG. 5D is an exemplary embodiment of a user interface for discovery and routing of media signal in which an application (e.g., iTunes) is connected.

FIG. 5D is an exemplary embodiment of a user interface for discovery and routing of media signal in which an application (e.g., iTunes) is connected. When an audio application (iTunes) is started, the channel labels for its outputs are constructed by concatenating the application name (iTunes) with the labels "Left" and "Right" which can be assumed because the virtual sound card only has two channels.

Figure 6:
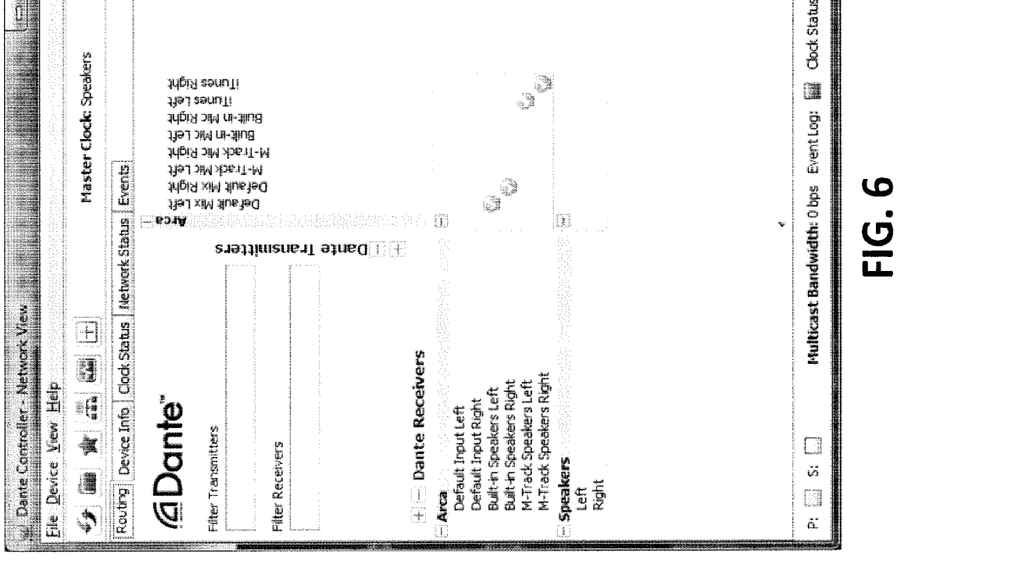
FIG. 6 is an exemplary embodiment of a user interface for internal routing of networked channels.

FIG. 6 is an exemplary embodiment of a user interface for internal routing of networked channels which shows how the controller (which configures routing between network channels) can be used to configure audio routing inside a computer running a system such as the system described herein. In FIG. 6, the output from iTunes is routed to the default sound card output for the computer. The routing is entirely internal to the computer. No signals cross the network as media packet streams.

While embodiments of the have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:

1. A system for providing networked access to media signals, the system comprising:
    at least one virtual media card configured to interface with at least one application that produces and/or consumes media signals, the virtual media card configured to support at least one of an application multiplexing/demultiplexing mode of operation, a fixed channel mode of operation, and an application multiplexing/demultiplexing mode of operation;
    at least one media interface configured to interface with at least one physical media card that produces and/or consumes media signals;
    a network interface configured to enable the system to exchange media signals with other devices on a common network;
    a reference clock configured to provide a common clock signal to the at least one virtual media card, the at least one media interface, and the common network; and
    an advertisement and discovery module configured to identify when the at least one application is started and/or stopped and when the at least one media card is attached and/or detached from the system;
    wherein the advertisement and discovery module is configured to:
        (i) make I/O channels of the at least one media card available to the system and the common network, and
        (ii) make I/O channels of the at least one application available to the system and the common network.

2. A system for providing networked access to media signals, the system comprising:
    at least one virtual media card configured to interface with at least one application that produces and/or consumes media signals, the virtual media card configured to support at least one of an application multiplexing/demultiplexing mode of operation, a fixed channel mode of operation, and an application multiplexing/demultiplexing mode of operation;
    a network interface configured to enable the system to exchange media signals with other devices on a common network;
    a reference clock configured to provide a common clock signal to the at least one virtual media card and the common network; and
    an advertisement and discovery module configured to identify when the at least one application is started and/or stopped;
    wherein the advertisement and discovery module is configured to make I/O channels of the at least one application available to the system and the common network.

3. The system of claim 2, further comprising at least one media interface configured to interface with at least one physical media card that produces and/or consumes media signals;
    wherein the reference clock is configured to provide the common clock signal to the at least one media interface;
    wherein the advertisement and discovery module is configured to identify when the at least one media card is attached and/or detached from the system; and
    wherein the advertisement and discovery module is configured to make I/O channels of the at least one media card available to the system and the common network.

4. The system of claim 2, wherein the media signals are audio signals.

5. The system of claim 2, wherein the virtual media card is a virtual sound card.

6. The system of claim 2, wherein the media interface is an audio interface.

7. The system of claim 2, wherein the at least one physical media card is a sound card.

8. The system of claim 2, further comprising a media router configured to receive routing requirements and route the media signals from the at least one application and/or the at least one sound card that produces media signals to the at least one application and/or the at least one sound card that consume media signals.

9. The system of claim 8, further comprising a user interface for enabling a user to create the routing configurations for use by the media router.

10. The system of claim 9, wherein the user interface can be used to enable the connection of any combination of I/O channels.

11. The system of claim 2, wherein the at least one media interface includes a rate/phase matcher configured to match the rate and/or align the phase of the media signals passing between the at least one media card and the system.

12. The system of claim 11, wherein the rate/phase matcher uses an asynchronous sample rate converter to align the media signals.

13. The system of claim 2, further comprising a media transceiver configured to control the rate at which medial signals are produced and consumed by the at least one application, the at least one media card, and/or the other devices on the common network.

14. The system of claim 2, furtherer comprising media buffers configured to temporarily store media signals to compensate for timing variations within the system and the common network.

15. The system of claim 2, wherein each I/O channel has a network name constructed from the combination of a channel name and a device name.

16. The system of claim 2, wherein the virtual media card is configured to be used by multiple applications.

17. The system of claim 2, wherein the virtual media card supports a fixed channel mode of operation.

18. The system of claim 2, wherein the media signals provided to a single virtual media card from the multiple applications are mixed together.

* * * * *